United States Patent
Kim et al.

(10) Patent No.: US 10,080,182 B2
(45) Date of Patent: Sep. 18, 2018

(54) METHOD AND APPARATUS FOR TRANSCEIVING SIGNAL BY NAN TERMINAL IN WIRELESS COMMUNICATION SYSTEM

(71) Applicant: LG ELECTRONICS INC., Seoul (KR)

(72) Inventors: Dongcheol Kim, Seoul (KR); Byungjoo Lee, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 15/301,064

(22) PCT Filed: Apr. 2, 2015

(86) PCT No.: PCT/KR2015/003309
§ 371 (c)(1),
(2) Date: Sep. 30, 2016

(87) PCT Pub. No.: WO2015/152657
PCT Pub. Date: Oct. 8, 2015

(65) Prior Publication Data
US 2017/0034769 A1  Feb. 2, 2017

Related U.S. Application Data

(60) Provisional application No. 61/973,865, filed on Apr. 2, 2014, provisional application No. 61/993,293, filed on May 15, 2014.

(51) Int. Cl.
| | | |
|---|---|---|
| H04W 48/10 | (2009.01) | |
| H04W 48/08 | (2009.01) | |
| H04L 29/08 | (2006.01) | |
| H04W 4/06 | (2009.01) | |
| H04W 4/08 | (2009.01) | |
| H04W 84/12 | (2009.01) | |

(52) U.S. Cl.
CPC ............ *H04W 48/10* (2013.01); *H04L 67/16* (2013.01); *H04W 4/06* (2013.01); *H04W 48/08* (2013.01); *H04W 4/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,544,754 B1 * | 1/2017 | Lambert | ............... H04W 8/005 |
| 2009/0010399 A1 | 1/2009 | Kim et al. | |
| 2012/0243524 A1 | 9/2012 | Verma et al. | |
| 2013/0227152 A1 | 8/2013 | Lee et al. | |
| 2013/0272287 A1 | 10/2013 | Xiang et al. | |

(Continued)

*Primary Examiner* — Diane Lo
(74) *Attorney, Agent, or Firm* — Birch, Stewart, Kolasch & Birch, LLP

(57) ABSTRACT

An embodiment of the present invention relates to a method of transceiving a neighbor awareness networking (NAN) signal by a NAN device in a wireless communication system, the method comprising the steps of: receiving a NAN publish from an access point (AP); identifying a service from the NAN publish; and having association with the AP for the identified service, wherein the service is one of services of one or more stations (STAs) associated with the AP.

11 Claims, 13 Drawing Sheets

(56) References Cited

U.S. PATENT DOCUMENTS

| | | | |
|---|---|---|---|
| 2014/0087778 A1 | 3/2014 | Kim et al. | |
| 2014/0112189 A1* | 4/2014 | Abraham | H04W 4/206 370/254 |
| 2014/0293978 A1* | 10/2014 | Yang | H04W 8/005 370/338 |
| 2015/0172391 A1* | 6/2015 | Kasslin | H04L 67/16 370/338 |
| 2015/0200811 A1* | 7/2015 | Kasslin | H04L 41/12 370/254 |

* cited by examiner

FIG. 10
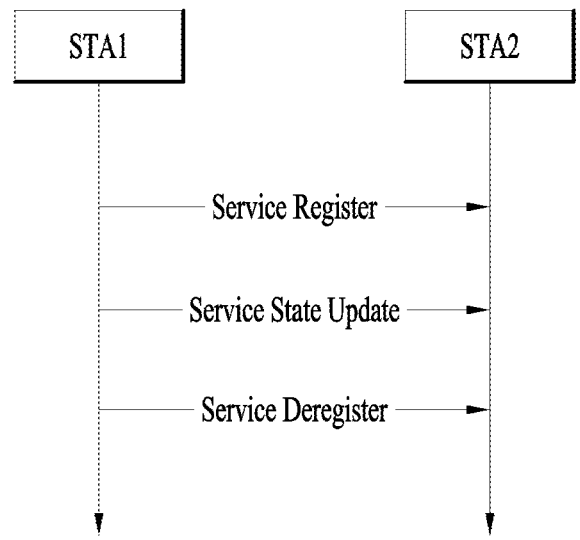
(a)
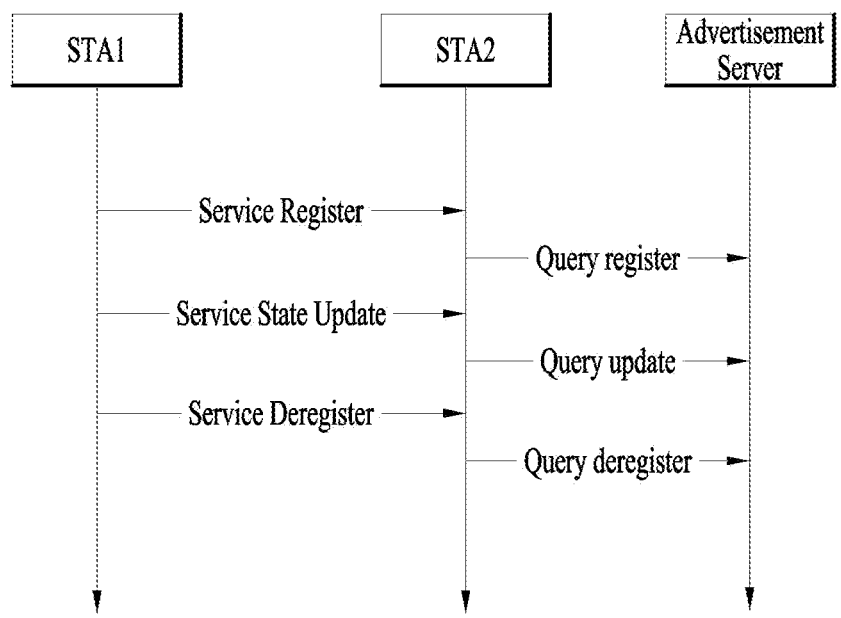
(b)

| GAS Initial Request Action Frame |||||| 
|---|---|---|---|---|---|
| Category | Action | Dialog Token | Advertisement Protocol IE | Query Request Length | Query Request |
| xx | xx | Token ID | xx | Length | Query data |
| 1 octet | 1 octet | 1 octet | Variable | 2 octets | Variable |

(b)

| ANQP Query Request Field ||||
|---|---|---|---|
| Info ID | Length | OI | Vendor-Specific Content |
| xx | Length | xx | Query data |
| 2 octets | 2 octets | 3 octets | Variable |

(c)

| Field name | Description |
|---|---|
| Request type | Register/deregister/service Field name |
| Service descriptors{ | |
| Service name or hash value | |
| Service status | Available or not |
| Service update indicator | Indicator |
| } | |
| Register's mac address | Mac address |
| Register's device name | Device name |

| ANQP Query Request Vendor-Specific Content | | | | | |
|---|---|---|---|---|---|
| OUI Subtype | Service update Indicator | ANQP Query Request Vendor-Specific Content TLV | | | |
| | | Length | Service Protocol Type | Service Transaction ID | Query data |
| xx | xx | Length | Service Protocol Type | Transaction ID | xx |
| 1 octet | 2 octets | 2 octets | 1 octet | 1 octet | Variable |

(b)

| Value | Meaning |
|---|---|
| 0 | All Service Protocol Types |
| 1 | Bonjour |
| 2 | UPnP |
| 3 | WS-Discovery |
| 4 | Wi-Fi Display |
| 5-254 | Reserved |
| 255 | Vendor Specific |

METHOD AND APPARATUS FOR TRANSCEIVING SIGNAL BY NAN TERMINAL IN WIRELESS COMMUNICATION SYSTEM

CROSS REFERENCE TO RELATED APPLICATIONS

This application is the National Phase of PCT International Application No. PCT/KR2015/003309, filed on Apr. 2, 2015, which claims priority under 35 U.S.C. 119(e) to U.S. Provisional Application No's. 61/973,865, filed on Apr. 2, 2014 and 61/993,293, filed on May 15, 2014, all of which are hereby expressly incorporated by reference into the present application.

TECHNICAL FIELD

The present invention relates to a wireless communication system, and more particularly, to a method for a NAN (neighbor awareness networking) terminal to perform a state transition and apparatus therefor.

BACKGROUND ART

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable terminal such as a personal digital assistant (PDA), a laptop computer, a portable multimedia player (PMP), etc. based on a radio frequency technology.

DISCLOSURE OF THE INVENTION

Technical Task

The technical task of the present invention is to provide a method for a NAN terminal to obtain information on a service.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of transmitting and receiving signals by a NAN (neighbor awareness networking) device in a wireless communication system, including: receiving a NAN Publish from an AP (access point); identifying a service from the NAN Publish; and having an association with the AP for the identified service, wherein the service is one of services of one or more STAs (stations) associated with the AP.

In a second technical aspect of the present invention, provided herein is a NAN (neighbor awareness networking) user equipment device in a wireless communication system, including a transmitting module and a processor, wherein the processor is configured to receive a NAN Publish from an AP (access point), identify a service from the NAN Publish, and have an association with the AP for the identified service and wherein the service is one of services of one or more STAs (stations) associated with the AP.

At least one of the following items may be included in the first and second technical aspects of the present invention.

The one or more STAs may include an STA without a capability of transmitting and receiving NAN-related signals.

If a P2P (peer to peer) link configuration can be established between the NAN device and an STA related to the identified service, the association procedure with the AP may be omitted.

The NAN Publish may correspond to a response to a NAN Subscribe transmitted from the NAN device to the AP.

Information related to the services of the one or more STAs may be cached by the AP.

The cached information may be re-configured by the AP in the form of a service descriptor containing a service name, a service status, a service updater, a MAC address of a register, and a device name of the register.

Information related to the services of the one or more STAs may be registered to the AP by a GAS (generic advertisement service) initial request action frame.

Information related to the services of the one or more STAs may be registered to the AP by an ANQP (access network query protocol) query request frame.

The AP may transmit information related to the services of the one or more STAs through at least one selected from the group consisting of a discovery beacon frame, a synchronization beacon frame, and a service discovery frame.

The AP may operate in a master-synchronization state.

If a NAN service discovery frame transmitted from the NAN device is a response to a Subscribe message, the NAN service discovery frame may contain at least one information selected from the group consisting of a device name, a manufacturer, a model name, a model number, a serial number, a primary device type, and a secondary device type.

Advantageous Effects

According to the present invention, a NAN terminal can discovery/use services of devices located one or more hops away or devices not supporting NAN.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram illustrating a discovery window and the like.

FIGS. 9 to 16 are diagrams for explaining service registration and service information acquisition at a NAN device according to the present invention.

BEST MODE FOR INVENTION

Figure 1:
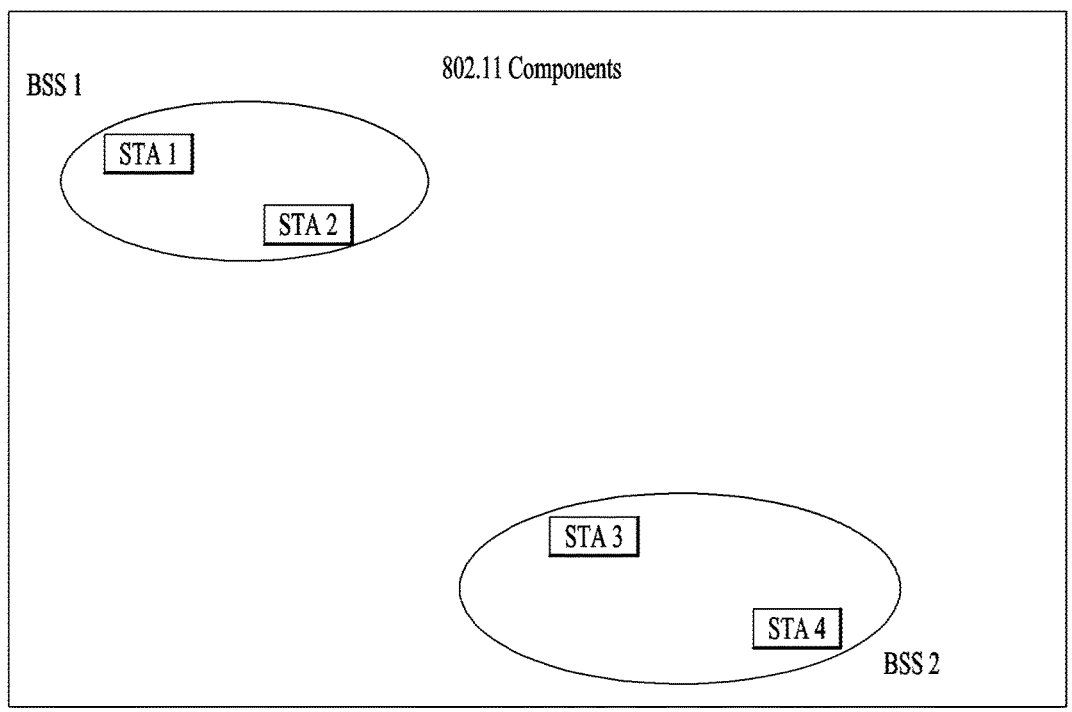
FIG. 1 is a diagram illustrating an exemplary structure of the IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
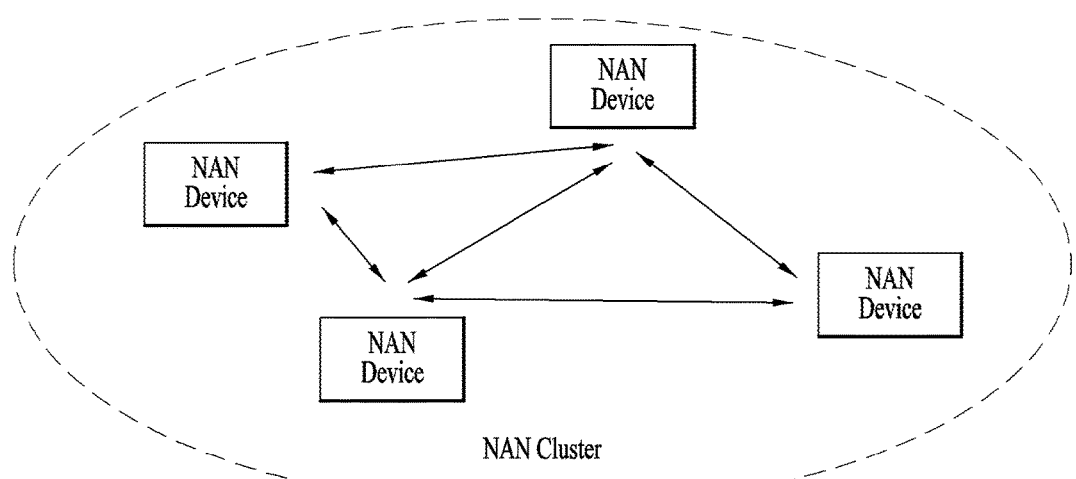
FIGS. 2 and 3 are diagrams illustrating examples of a NAN cluster.
Figure 3:
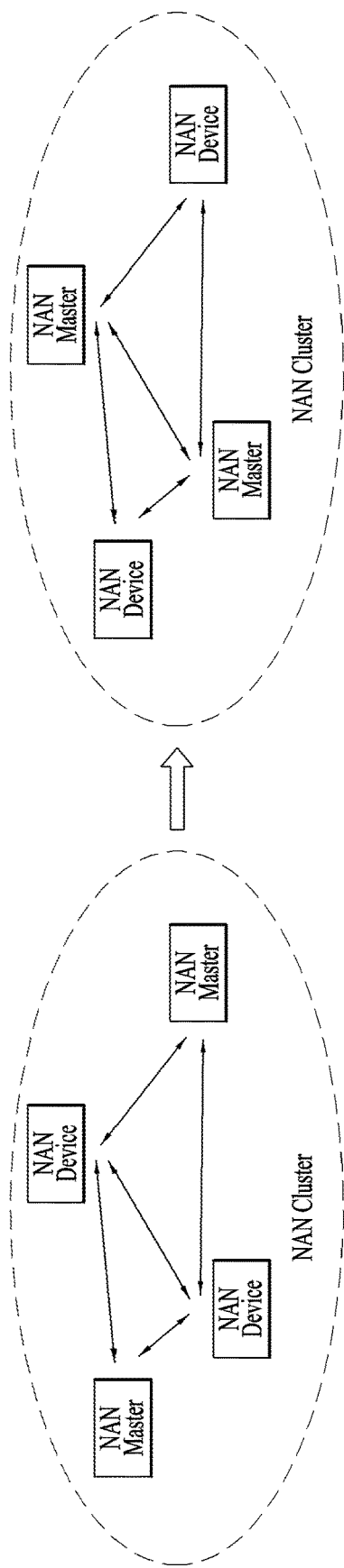

A NAN network can be constructed with NAN terminals (can be called as NAN devices and STA using NAN parameter set can be included in the NAN devices) that use a set of identical NAN parameters (e.g., a time interval between consecutive discovery windows, an interval of a discovery window, a beacon interval, a NAN channel, etc.). A NAN cluster can be formed by NAN terminals and the NAN cluster means a set of NAN terminals that are synchronized on the same discovery window schedule. And, a set of the same NAN parameters is used in the NAN cluster. FIG. 2 illustrates an example of the NAN cluster. A NAN terminal included in the NAN cluster may directly transmit a multicast/unicast service discovery frame to a different NAN terminal within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
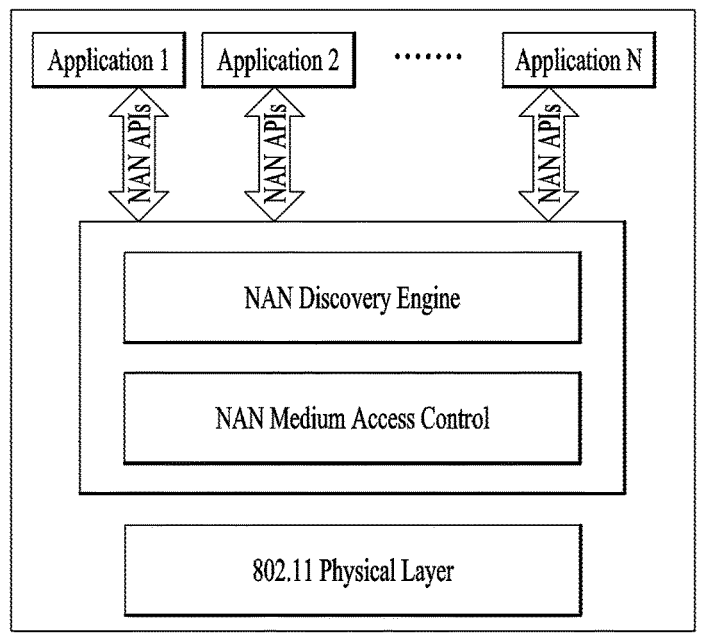
FIG. 4 illustrates an example of a structure of a NAN device (terminal).

FIG. 4 illustrates an example of a structure of a NAN device (terminal). Referring to FIG. 4, the NAN terminal is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
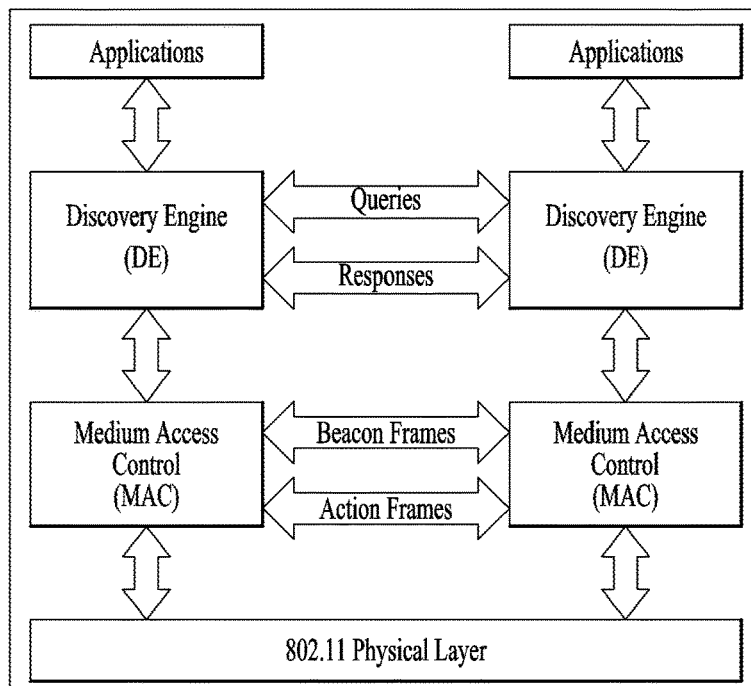
FIGS. 5 and 6 illustrate relations between NAN components.
Figure 6:
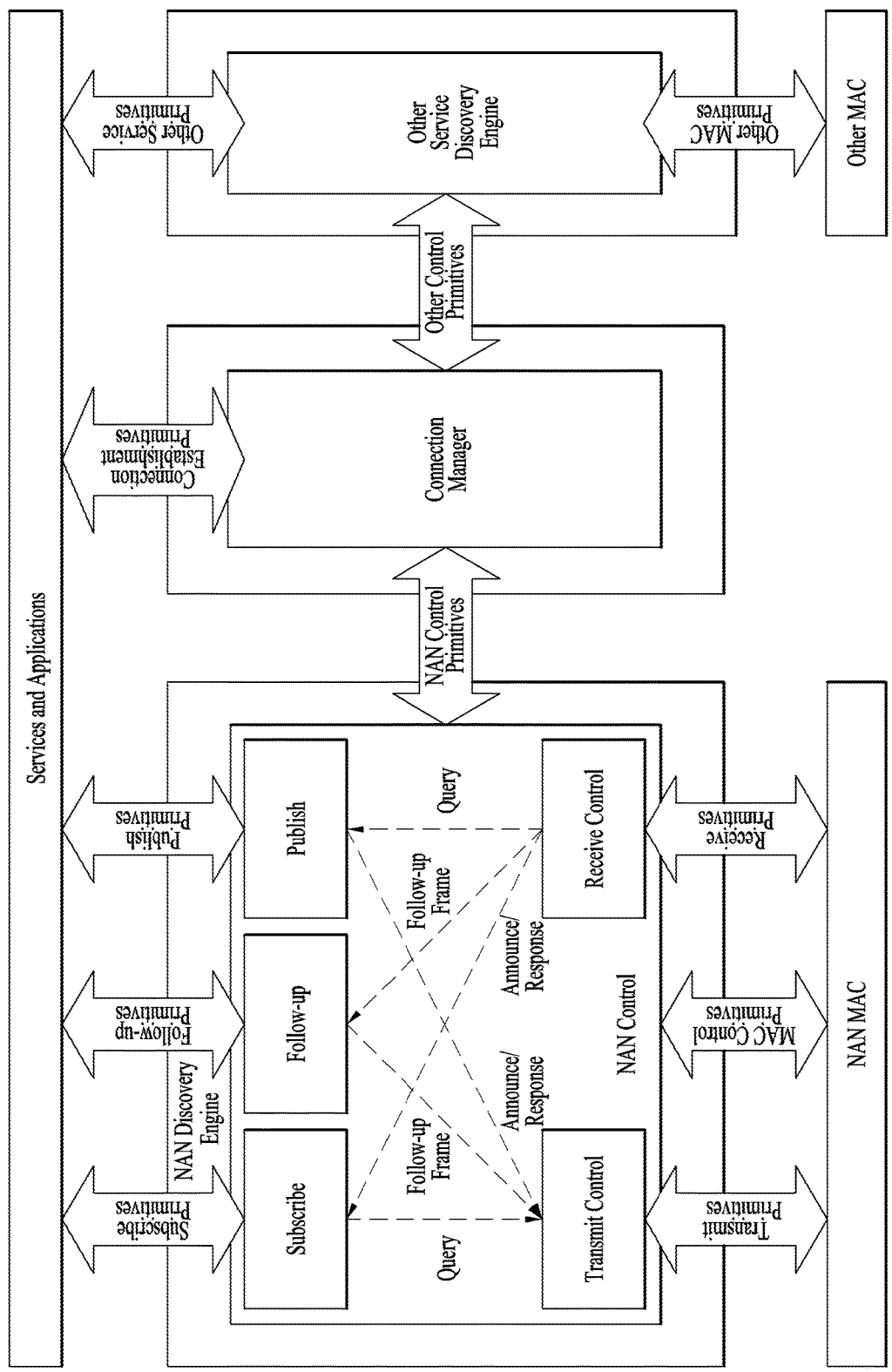

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
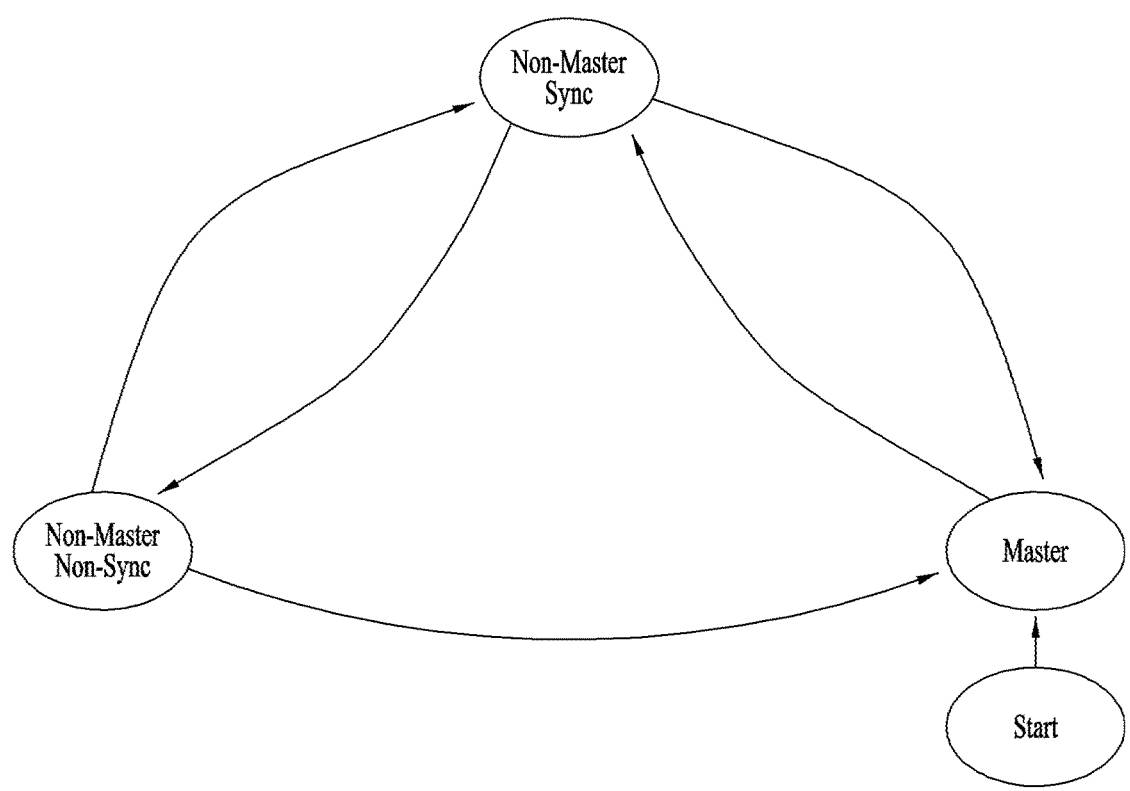
FIG. 7 is a diagram illustrating a state transition of a NAN device (terminal).

As mentioned in the foregoing description, a NAN device (terminal) can serve as a NAN master and the NAN master can be changed. In other words, roles and states of the NAN terminal can be shifted in various ways and related examples are illustrated in FIG. 7. The roles and states, which the NAN terminal can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN terminal can be determined according to a master rank (MR). The master rank indicates the preference of the NAN terminal to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference} * 2^{56} + \text{RandomFactor} * 2^{48} + \text{MAC}[5] * 2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN terminal that activates a NAN service and initiates a NAN cluster, each of the Master Preference and the Random Factor is set to 0 and NANWarmUp is reset. The NAN terminal should set a Master Preference field value in the master indication attribute to a value greater than 0 and a Random Factor value in the master indication attribute to a new value until when the NANWarmUp expires. When a NAN terminal joins a NAN cluster in which the Master Preference of an anchor master is set to a value greater than 0, the corresponding NAN terminal may set the Master Preference to a value greater than 0 and the Random Factor to a new value irrespective of expiration of the NANWarmUp.

Moreover, a NAN terminal can become an anchor master of a NAN cluster depending on an MR value. That is, all NAN terminals have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN terminal becomes an anchor master of a currently existing NAN cluster, the NAN terminal adopts TSF used in the currently existing NAN cluster without any change.

The NAN terminal can become the anchor master in the following cases: if a new NAN cluster is initiated; if the master rank is changed (e.g., if an MR value of a different NAN terminal is changed or if an MR value of the anchor master is changed); or if a beacon frame of the current anchor master is not received any more. In addition, if the MR value of the different NAN terminal is changed or if the MR value of the anchor master is changed, the NAN terminal may lose the status of the anchor master. The anchor master can be determined according to an anchor master selection algorithm in the following description. In particular, the anchor master selection algorithm is the algorithm for determining which NAN terminal becomes the anchor master of the NAN cluster. And, when each NAN terminal joins the NAN cluster, the anchor master selection algorithm is driven.

If a NAN terminal initiates a new NAN cluster, the NAN terminal becomes the anchor master of the new NAN cluster. If a NAN synchronization beacon frame has a hop count in excess of a threshold, the NAN synchronization beacon frame is not used by NAN terminals. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN terminal compares an anchor master rank value in the beacon frame with a stored anchor master rank value. If the stored anchor master rank value is greater than the anchor master value in the beacon frame, the NAN terminal discards the anchor master value in the beacon frame. If the stored anchor master value is less than the anchor master value in the beacon frame, the NAN terminal newly stores values greater by 1 than the anchor master rank and the hop count included in the beacon frame and an AMBTT value in the beacon frame. If the stored anchor master rank value is equal to the anchor master value in the beacon frame, the NAN terminal compares hop counters. Then, if a hop count value in the beacon frame is greater than a stored value, the NAN terminal discards the received beacon frame. If the hop count value in the beacon frame is equal to (the stored value−1) and if an AMBTT value is greater than the stored value, the NAN terminal newly stores the AMBTT value in the beacon frame. If the hop count value in the beacon frame is less than (the stored value−1), the NAN terminal increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN terminal exceeds the stored AMBTT value by more than 16*512 TUs (e.g., 16 DW periods), the NAN terminal may assume itself as an anchor master and then update an anchor master record. In addition, if any of MR related components (e.g., Master Preference, Random Factor, MAC Address, etc.) is changed, a NAN terminal not corresponding to the anchor master compares the changed MR with a stored value. If the changed MR of the NAN terminal is greater than the stored value, the corresponding NAN terminal may assume itself as the anchor master and then update the anchor master record.

Moreover, a NAN terminal may set anchor master fields of the cluster attributes in the NAN synchronization and discovery beacon frames to values in the anchor master record, except that the anchor master sets the AMBTT value to a TSF value of corresponding beacon transmission. The NAN terminal, which transmits the NAN synchronization beacon frame or the discovery beacon frame, may be confirmed that the TSF in the beacon frame is derived from the same anchor master included in the cluster attribute.

Moreover, a NAN terminal may adopt a TSF timer value in a NAN beacon received with the same cluster ID in the following case: i) if the NAN beacon indicates an anchor master rank higher than a value in an anchor master record of the NAN terminal; or ii) if the NAN beacon indicates an anchor master rank equal to the value in the anchor master record of the NAN terminal and if a hop count value and an AMBTT value in the NAN beacon frame are larger values in the anchor master record.

NAN Synchronization

NAN terminals (devices) participating in the same NAN Cluster may be synchronized with respect to a common clock. A TSF in the NAN cluster can be implemented through a distributed algorithm that should be performed by all the NAN terminals. Each of the NAN terminals participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN terminals may transmit synchronization beacon frames in order to help all NAN terminals in the NAN cluster synchronize their own clocks.

NAN beacon transmission is distributed. A NAN beacon frame is transmitted during a DW period existing at every 512 TU. All NAN terminals can participate in generation and transmission of the NAN beacon according to their roles and states. Each of the NAN terminals should maintain its own TSF timer used for NAN beacon period timing. A NAN synchronization beacon interval can be established by the NAN terminal that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
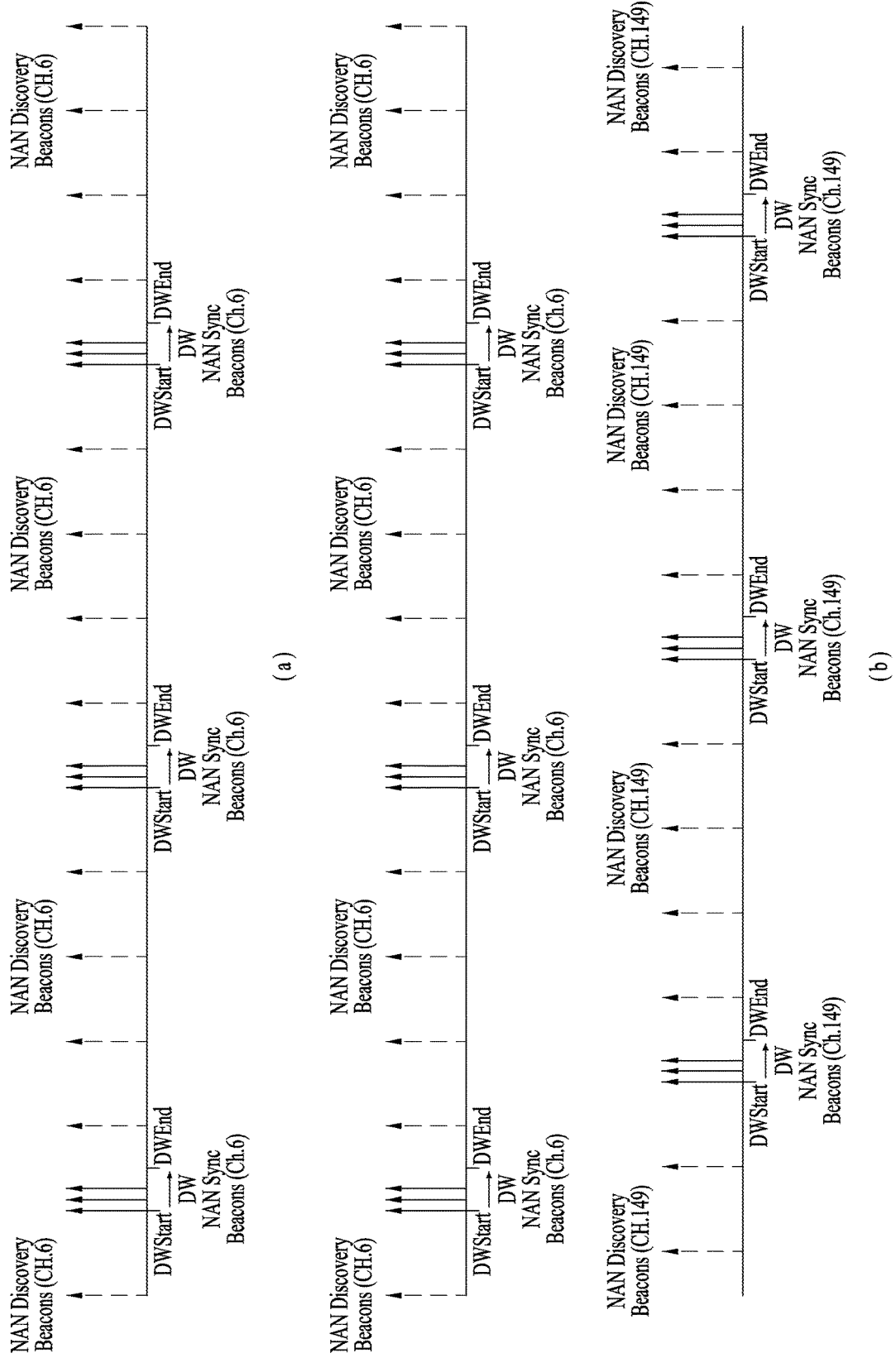

Each NAN terminal serving as a NAN master transmits a NAN discovery beacon frame from out of a NAN discovery window. On average, the NAN terminal serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN terminal participates, the NAN terminal serving as the NAN master is able to omit transmission of the NAN discovery beacon frame. In order to minimize power required to transmit the NAN discovery beacon frame, the NAN terminal serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (*a*) shows transmission of NAN discovery and synchronization beacon frames of a NAN terminal operating in 2.4 GHz band. FIG. 8 (*b*) shows transmission of NAN discovery and synchronization beacon frames of a NAN terminal operating in 2.4 GHz and 5 GHz bands.

State Transition of NAN Terminal

As described above, a NAN terminal can transition between Non-Master Non-Sync, Non-Master Sync, Master states. And, the state transition can be performed according to a result of comparison of RSSIs, AMRs, hop counts, and the like in synchronization beacon frames. In the following description, RSSI_middle may be greater than −60 dBm and RSSI_close may be greater than −75 dBm and less than the RSSI_middle.

A state transition from the Master state to the Non-Master Sync state may occur in the following cases. First of all, when a synchronization beacon frame with RSSI higher than the RSSI_close is received and a master rank of a device transmitting the synchronization beacon frame is higher than that of a receiving terminal, the state transition may occur. Secondly, when RSSIs higher than the RSSI_middle are received from three or more NAN devices and each master rank is higher than that of a receiving terminal, the state transition may occur.

A state transition from the Non-Master state to the Master state may occur when a NAN terminal fails to receive a synchronization beacon frame with RSSI higher than a first value in a NAN cluster and a master rank of a device transmitting the NAN synchronization beacon frame is higher than that of the NAN terminal. Alternatively, the above state transition may occur when a NAN terminal fails to receive synchronization beacon frames with RSSI higher than a second value (RSSI_middle) from less than three NAN terminals and a master rank of each less than three NAN terminals is higher than that of a receiving terminal.

A state transition from the Non-Master Sync state to the Non-Master Non-Sync state may occur when a synchronization beacon frame with RSSI higher than the RSSI_close is received, AMR of the synchronization beacon frame is equal to that of a NAN device, and a hop count of a device transmitting the synchronization beacon frame is lower than that of the NAN device. Alternatively, the above state transition may occur in the following case: a synchronization beacon frame with RSSI higher than the RSSI_close is received; AMR of the synchronization beacon frame is equal to that of a NAN device; hop counts are equal to each other; and MR of a device transmitting the synchronization beacon frame is higher than that of the NAN terminal. Alternatively, the state transition may occur in the following case: synchronization beacon frames with RSSI higher than the RSSI_middle are received from three or more NAN devices; AMR of the synchronization beacon frame is equal to that of a NAN terminal; and a hop count of a device transmitting the synchronization beacon frame is lower than that of the NAN device. Alternatively, the state transition may occur in the following case: synchronization beacon frames with RSSI higher than the RSSI_middle are received from three or more NAN devices; AMR of the synchronization beacon frame is equal to that of a NAN terminal; and MR of a device transmitting the synchronization beacon frame is higher than that of the NAN terminal.

A state transition from the Non-Master Non-Sync state to the Non-Master Sync state may be performed at the end of DW in the following case: a synchronization beacon frame with RSSI higher than the RSSI_close is not received; AMR of the synchronization beacon frame is equal to that of a NAN terminal; and a hop count of the synchronization beacon frame is lower than that of the NAN terminal. Alternatively, the state transition may be performed at the end of DW in the following case: a synchronization beacon frame with RSSI higher than the RSSI_close is not received; AMR of the synchronization beacon frame is equal to that of a NAN terminal; hop count values are equal to each other; and MR of a device transmitting the synchronization beacon frame is higher than that of the NAN terminal. Alternatively, the state transition may be performed at the end of DW in the following case: synchronization beacon frames with RSSI higher than the RSSI_middle are received from equal to or less than three NAN devices; AMR of the synchronization beacon frame is equal to that of a NAN terminal; and a hop count of the synchronization beacon frame is lower than that of the NAN terminal. Alternatively, the state transition may be performed at the end of DW in the following case: synchronization beacon frames with RSSI higher than the RSSI middle are received from equal to or less than three NAN devices; AMR of the synchronization beacon frame is equal to that of a NAN terminal; hop count values are equal to each other; and MR of a device transmitting the synchronization beacon frame is higher than that of the NAN terminal.

Hereinafter, a method of transmitting and receiving signals at a NAN device according to various embodiments of the present invention will be described based on the above explanation.

Embodiment 1

The embodiment 1 is directed to a method for a NAN device (terminal) to discover a service. According to the existing NAN cluster architecture, devices located within one hop or a communication possible range are allowed to use NAN services. In other words, according to the related art, devices within a range capable of transmitting and receiving service discovery frames are allowed to discover each other and/or services provided thereby. Moreover, it is difficult to discover/use a service provided by a user equipment that cannot transmit and receive NAN service discovery frames, for example, an STA (station) without a capability of transceiving NAN-related signals. The following embodiments of the present invention are devised to overcome the above-mentioned limitations.

Figure 9:
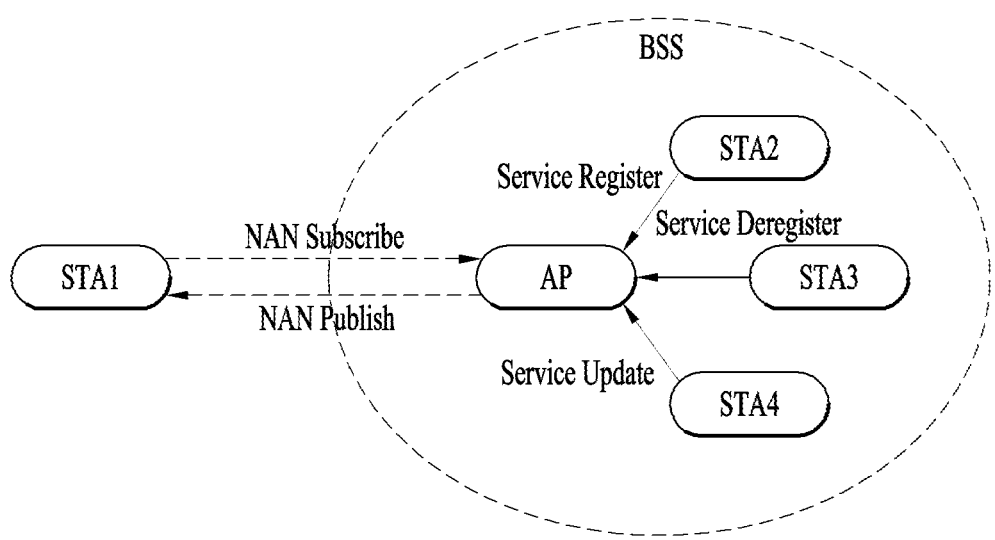

FIG. 9 illustrates a topology including an AP (access point) according to an embodiment of the present invention. Referring to FIG. 9, one BSS (basic service set) is composed of AP, STA2, STA3, and STA4. In this case, the STA2, STA3, and STA4 may access the AP according to the IEEE 802.11 standard. It is premised that the AP is a NAN enabled device with a NAN interface and the STA2, STA3, and STA4 are legacy devices that do not support NAN (or do not have capabilities of transmitting and receiving NAN-related signals). In addition, the STA2, STA3, and STA4 may be devices supporting multiple services such as Miracast, WFDS (Wi-Fi Direct Service; Send, Play, Display, Print, and Enable), WSB (Wi-Fi Serial Bus), Wi-Fi Docking, and the like in higher application layers. Moreover, STA1 is not currently connected to the BSS constructed by the AP and it may be a NAN enabled device capable of supporting both of the legacy Wi-Fi function and the NAN interface.

After receiving a NAN Publish from the AP, a NAN device (STA 1) can identify a service from the received NAN Publish. That is, the NAN device can determine whether to associate with the AP based on the service(s)/information on the service(s) contained in the NAN Publish. When the NAN Publish includes the service/information on the service, which the NAN device desires to discover, the NAN device may have an association with the AP for the identified service. By doing so, the NAN device can be provided with the identified service. If the STA providing the identified service is a NAN device, the service may be provided through the NAN interface. On the contrary, if the STA providing the identified service does not support the NAN, the service may be provided through the AP. If it is possible to establish a P2P link configuration between the NAN device and the STA related to (providing) the identified service (i.e., both of the devices support the Wi-Fi Direct Service), the NAN device can omit the association procedure with the AP. In other words, the NAN device can be provided with the service in a manner of establishing the P2P link with the STA related to the identified service.

In the above description, the service may correspond to one of the services provided by one or more STAs (e.g., STA 2, STA 3, and STA 4 in FIG. 9). Information related to the services provided by one or more STAs may be registered to the AP according to at least one of the following methods. According to one embodiment of the present invention, a service of the legacy device that does not supports the NAN can be discovered through the NAN based on such a configuration.

First of all, information related to one or more services can be registered to an AP when an STA associated with the AP registers/deregisters/updates its service(s). FIG. 10 illustrates an example in which an STA registers/deregisters/updates its service. Particularly, FIG. 10 (a) shows an example in which a service management function is implemented as an internal function of an STA. In FIG. 10 (a), STA 1 is an STA, which does not serve as the AP, and STA 2 is an STA serving as the AP or performing an AP function. FIG. 10 (b) shows an example in which a service management function is implemented as an external function of an STA. Similarly, in FIG. 10 (b), STA 1 is the STA, which does not serve as the AP, and STA 2 is the STA serving as the AP or performing the AP function. In FIG. 10 (a), when the STA 1 requests the STA 2 to register/deregister/update the service, the STA 2 performs processing related the service registration/deregister/update. However, in FIG. 10 (b), the STA 2 asks a separate advertisement server to perform the processing (i.e., transmits Query register, Query update, and Query deregister).

For the service registration/deregistration/update process of the STA, a GAS (generic advertisement service) initial request action frame illustrated in FIG. 11 (a) and an ANQP (access network query protocol) query request field illustrated in FIG. 11 (b) can be used. Moreover, the fields illustrated in FIG. 11 (c) may be used for Query data of FIGS. 11 (a) and (b). Alternatively, an ANQP query request frame show in FIG. 12 (a) can be used for the service registration/deregistration/update process of the STA. In this case, service protocol types defined in FIG. 12 (b) can be used for a service protocol type field. In addition, a service descriptor list of the service registration/deregistration/update process of the STA may include service name or hash value, service status, service updater, register's MAC address, and register's device name.

Secondly, the information related to the one or more services can be cached by the AP. That is, the AP can cache information related to service discovery performed by user equipments associated with the AP (in this case, service discovery information of an IP layer may also be included), and then inform the information in the case of NAN operation. The cached information may be re-configured by the AP in the form of a service descriptor, which contains service name or hash value, service status, service updater, register's MAC address, and register's device name.

A NAN device supporting an AP mode can also inform the information configured as described above in the case of the NAN operation. In the following description, it is assumed that a NAN device supports the AP mode. In addition, an AP is assumed to be a fixed type having a power source connected thereto. Moreover, master preference may be set equal to or greater than 128 such that the AP operates in the Master role and Synchronization state in the NAN. When the AP operates in the AP mode and supports the NAN, the corresponding AP can be considered as that it is associated with a plurality of user equipments via the legacy mode. This may mean that multiple services can be provided through the AP and services of different NAN devices associated with the corresponding AP can also be provided at the same time. Thus, the NAN device supporting the AP mode can include information on the services, which are supported (obtained) in the AP mode, in discovery beacon, synchronization beacon, and/or service discovery frames.

According to the existing NAN standard, Service ID List Attribute has been defined in NAN IE to inform service information of a NAN device. However, in the case of the NAN device supporting the AP mode, Service ID List supported by WLAN Infrastructure Attribute and the AP mode can be added and informed.

For instance, the Attribute can be defined as shown in Table 3. In addition, Service Descriptor List of Table 3 can be defined as shown in Table 4.

TABLE 3

| Field | Size (octets) | Value | Description |
|---|---|---|---|
| Attribute ID | 1 | 0x0x | Identifies the type of NAN attribute. |
| Length | 2 | Variable | Length of the following fields in the attribute. |
| Service ID | 6 * N | Variable | One or more Service IDs, where N is the number of Service IDs in this container. |
| Service Descriptor List | xx * N | Variable | AP's service information |

TABLE 4

| Field name | Size(octets) | Value | Description |
|---|---|---|---|
| Service name or hash value | xx or 6 | xx | Service name or hash value |
| Service status | 1 | xx | Available or not |
| Service update indicator | 1 | xx | Indicator |
| Register's mac address | xx | xxx | Mac address |
| Register's device name | xx | xx | Device name |

Moreover, if the AP stores information on service discovery/response that uses an UPnP protocol and also supports the NAN, related information can be informed using Tables 3 and 4 above.

As another example, the AP can broadcast the services registered according to the above-mentioned procedure by including them in a beacon frame. Alternatively, such information can be transferred during a procedure for transceiving a request/response with an STA. In this case, a GAS initial request/response frame may be used. Details shall be omitted in order to avoid redundancy.

FIGS. 13 to 16 illustrate various examples of procedures for registering the above-mentioned services and discovering the registered services.

Figure 13:
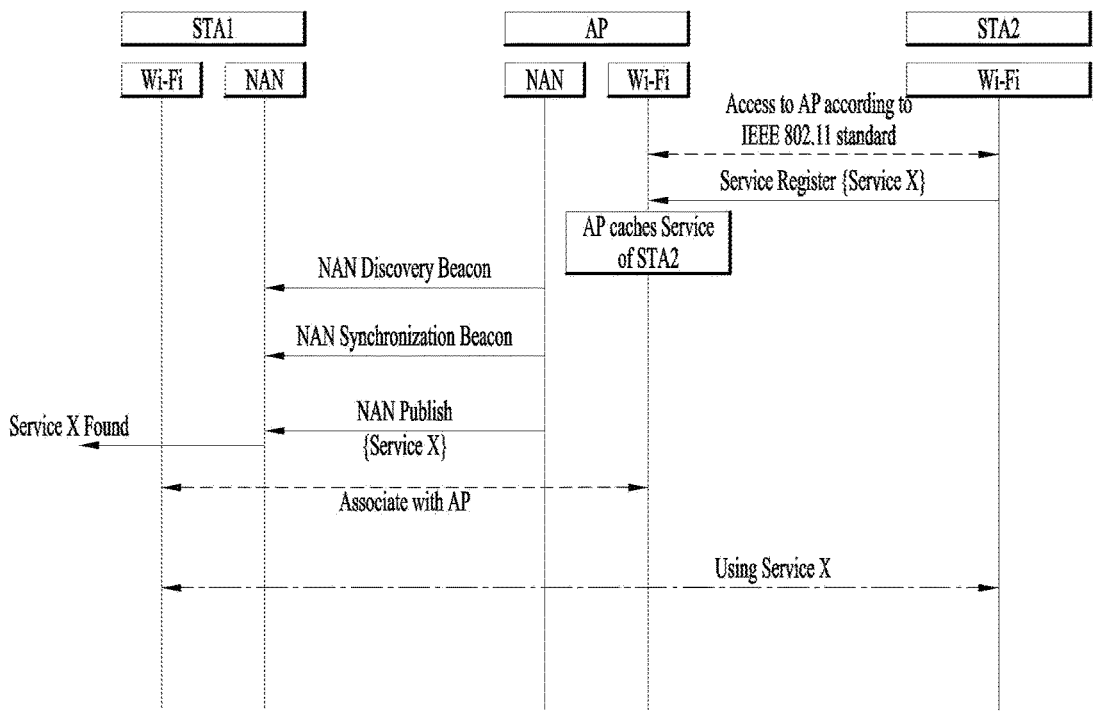

FIG. 13 shows an embodiment in which when an AP is connected to STA2, the STA2 registers a service according to the proposal of the present invention and STA1 discovers the registered service through NAN. Referring to FIG. 13, the STA2 accesses the AP according to the IEEE 802.11 standard, and then registers the service (Service X) supported by the STA2 to the AP STA as described above. Here, the AP STA supports both of the legacy Wi-Fi and the NAN. Particularly, the AP STA uses a Wi-Fi interface to manage its BSS and communicate therebetween, and communicate with a NAN cluster through the NAN. The AP can publish the service (Service X), which is registered through the Wi-Fi legacy interface, to NAN STAs located out of the BSS through a NAN interface. Although the STA1 has not accessed the AP, the STA1 can identify the STA2's service (Service X), which is provided through the AP, using the NAN interface and then determine whether to access the AP in order to use the Service X. Alternatively, if the STA2 supports the Wi-Fi Direct, the STA1 can use the Service X of the STA2 through the Wi-Fi Direct without the association with the AP.

Figure 14:
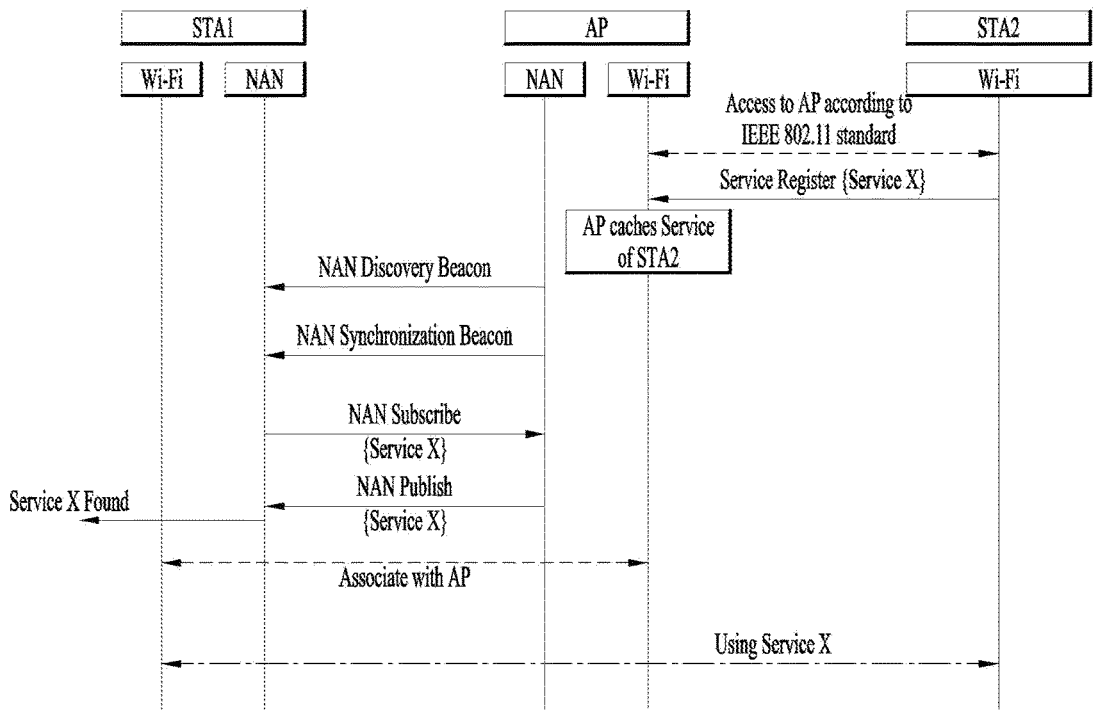

FIG. 14 illustrates an example in which STA1 actively discovers Service X through a NAN interface. When a device supporting a specific service (Service X), which belongs to a BSS of an AP, registers the specific service, the AP may receive a Subscribe message for the Service X and then transmit a Publish message in response to the received Subscribe message. In this case, the Publish message transmitted by the AP may contain both information on the Service X and information on the device supporting the Service X.

Figure 15:
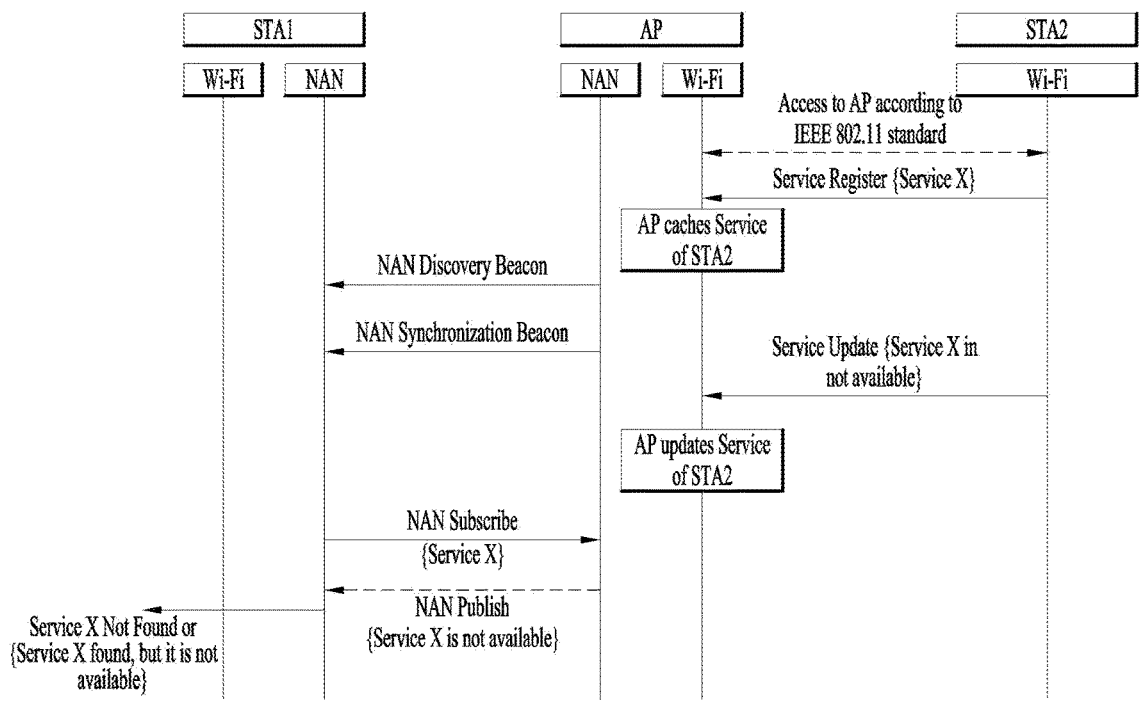

FIG. 15 illustrates an embodiment in which a status of the service that is initially registered by STA2 is changed (or updated) or the STA2 deregisters the service. If a status of Service X, which indicates whether the Service X is supported or not, is changed after an elapse of a prescribed time since STA2 has registered the Service X initially, the STA2 updates the AP on the fact that the Service X is not available through Service Update. Similarly, when the STA2 does not desire to register the service no more, the STA2 can deregister the registered service through Service Deregister. In case that the specific service becomes unavailable as described above, if an external NAN device (STA1) subscribes for the Service X, the AP may transmit a response with respect to the status of the corresponding service. Particularly, the AP may transmit either i) a response indicating that although the STA2 supporting the Service X currently exists within the BBS, the Service X is not available now or ii) no response.

Figure 16:
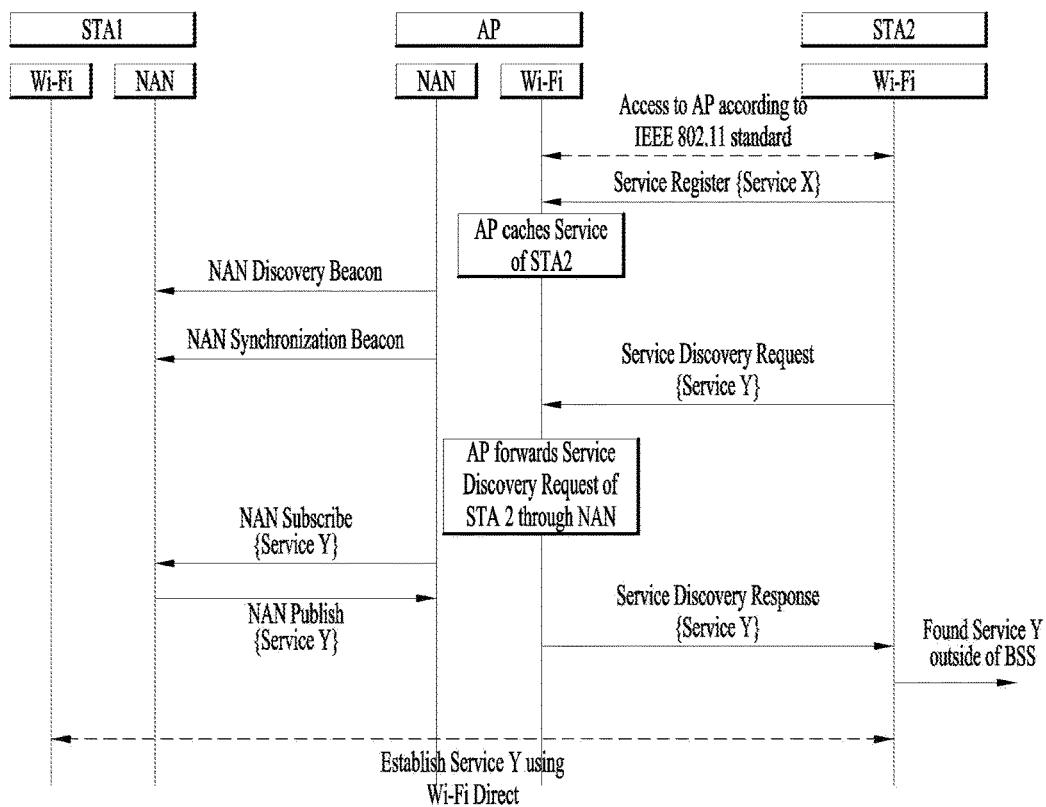

Referring to FIG. 16, STA2 corresponds to a register for registering a service and also serves as a seeker for discovering a service in the vicinity. The STA2 requests an AP to search for a device supporting Service Y in the vicinity through a service discovery request. After receiving the service discovery request through the legacy Wi-Fi, the AP forwards the received service discovery request through a NAN interface. In other words, the AP subscribes for the device supporting the Service Y in the vicinity through the NAN interface. In this case, if STA1 supports the Service Y, the STA1 may publish the Service Y, whereby the AP can obtain information on the STA1. Thereafter, the AP may transmit the information on the STA1 supporting the Service Y to the STA2 through the Wi-Fi interface, and thus the STA2 can discover the Service Y within or outside the BSS. In this embodiment, if the STA1 supports the Service Y through the Wi-Fi Direct, the STA2 can use the Service Y after establishing Wi-Fi Direct connection to the STA1. Although the above embodiment is described focusing on enlargement of a service discovery coverage through association with devices with a Wi-Fi Infrastructure function among devices supporting NAN functionality, registration/collection of service information of the associated devices, and notification of the registered/collected service information instead of the associated devices, the present invention is not limited thereto. That is, according to the present invention, the above-mentioned embodiment can be extensively applied to a NAN enable/capable device capable of having a wide coverage similar to the Wi-Fi Infrastructure, registering/updating/deregistering services of a plurality of NAN devices, and broadcasting/unicasting the corresponding services instead of the NAN devices. For instance, in the above-mentioned description, the AP can be replaced with a device with the Wi-Fi Infrastructure function or a device with a concept of discovery proxy (i.e., a device with the NAN functionality, which has a coverage wider than that of a normal NAN device (since the device is physically located on a high point) and can also perform basic NAN functions such as Publish/Subscribe for NAN devices).

Embodiment 2

The embodiment 2 is directed to improve user experience in terms of NAN. In the related art, since a NAN device is identified by only a NAN MAC address without information such as a device name, a device type, a manufacturer, a model type, a model number, etc., it is difficult to guarantee sufficient user experience. To solve this problem, the following methods can be considered.

Embodiment 2-1

A NAN frame can include WSC IE shown in Table 5 below. Here, the NAN frame may be one of a NAN discovery beacon frame, a NAN synchronization beacon frame, and a NAN service discovery frame. Alternatively, the WSC IE may be simultaneously included in two or more of the aforementioned NAN frames. As a particular example of including the WSC IE in the NAN service discovery frame, i) the WSC IE may be always included when the NAN service discovery frame is transmitted, ii) the WSC IE may be included only when the NAN service discovery frame is for announcement/publish purpose, and iii) the WSC IE may be included only when the NAN service discovery frame carries a response to Subscribe.

TABLE 5

| Attribute | R/O/C | Notes |
|---|---|---|
| Version | R | Deprecated. Always set to 0x10 for backwards compatibility. See Version2 for current version negotiation mechanism. |
| Wi-Fi Simple Configuration State | R | 0x01 (Not Configured), 0x02 (Configured). |
| AP Setup Locked | C | Must be included if value is TRUE |
| Selected Registrar | C | Indicates if the user has recently activated a Registrar to add an Enrollee. If Selected Registrar is TRUE, then the Selected Registrar must be included. |
| Device Password ID | C | Device Password ID indicates the method or identifies the specific password that the selected Registrar intends to use. If any of the active registrars are in PBC mode this value shall be 0x0004 (Pushbutton). Note that WSC 1.0 devices may use other values. If Selected Registrar is TRUE, then the Device Password ID must be included. |
| Selected Registrar Configuration Methods | C | This attribute contains the Configuration methods active on all of the selected Registrars. This attribute must be the union of the Selected Registrar Configuration Methods from all active registrars (internal and external). If Selected Registrar is TRUE, then the Selected Registrar Configuration Methods must be included. |
| Response Type | R | |
| UUID-E | R | Unique identifier of the AP. |
| Manufacturer | R | |
| Model Name | R | |
| Model Number | R | |
| Serial Number | R | |
| Primary Device Type | R | |
| Device Name | R | User-friendly description of device. |
| Configuration Methods | R | Configuration Methods corresponds to the methods the AP supports as an Enrollee for adding external Registrars. |
| RF Bands | C | Indicates all RF bands available on the AP. A dual-band AP must provide this attribute. |
| Version2 (inside WFA Vendor Extension) | C | 0x20 = version 2.0, 0x21 = version 2.1, etc. Must be included in protocol version 2.0 and higher. |
| AuthorizedMACs (inside WFA Vendor Extension) | C | List of enrollee MAC addresses that have been registered to start WSC. The AP includes this field in probe. responses so enrollees can tell if they have been registered to start WSC. There may be multiple enrollees active on the network, but not all of them have been registered to start WSC. This element allows an enrollee to detect if they should start WSC or not. The AP must include this attribute if any of the Registrars provides a list of authorized MAC addresses. |
| <other . . . > | O | Multiple attributes are permitted. |

In Table 5 above, information (as a response to a request) related a NAN device such as a device name, a manufacturer, a model name, a model number, a serial number, primary device type, a secondary device type and the like may be partially and selectively included.

Embodiment 2-2

Information such as a device name, a device type, a manufacturer, a model type, a model number, etc. can be defined in the form of NAN Device Information Attribute as shown in Table 6 below. More particularly, the NAN Device Information Attribute can be defined as shown in Table 7. In Table 7, 'B' indicate a byte.

TABLE 6

| Attribute ID | Mandatory/ Optional | Description |
|---|---|---|
| 0 | M | Master Indication Attribute |
| 1 | M | Cluster Attribute |
| 2 | O | Service ID List Attribute |
| 3 | O | NAN Connection Capability Attribute |
| 4 | O | WLAN Infrastructure Attribute |
| 5 | O | P2P Operation Attribute |
| 6 | O | IBSS Attribute |
| 7 | O | Mesh Attribute |
| 8 | O | Further NAN Service Discovery Attribute |
| 9 | O | Further Availability Map Attribute |
| 10 | M | Service Descriptor Attribute |
| 11 | O | Country Code Attribute |
| 12 | O | Ranging Attribute |
| xx (new attribute ID) | M | NAN Device Information Attribute |
| 13-220 | N/A | Reserved |
| 221 | O | Vendor Specific Attribute |
| 222-255 | N/A | Reserved |

TABLE 7

| Field Nam | Size (Octets) | Value | Description |
|---|---|---|---|
| Attributes ID | xx | | |
| Length | xx | variable | |
| Device Name | <=32 B | | User-friendly description of device |
| Manufacturer | <=64 B | | |
| Model Name | <=32 B | | |
| Model Number | <=32 B | | |
| Serial Number | <=32 B | | |
| Primary Device Type | 8 B | | |
| Secondary Device Type | <=128 B | | |
| RF Bands | 1 B | | Specific RF band used for this message |
| . . . | | | |

Table 8 below shows use of the NAN Device Information Attribute in the NAN beacon frames (i.e., NAN discovery and synchronization beacon frames) and the NAN service discovery frame (SDF).

TABLE 8

| | | NAN Beacons | | |
|---|---|---|---|---|
| Attribute ID | Description | Sync | Discovery | NAN SDF |
| . . . | | | | . . . |
| xx (newly added Attribute ID) | NAN Device Information Attribute | NO | YES/O | xx(newly added Attribute ID) |
| . . . | | | | . . . |

Embodiment 2-3

Information such as a device name, a device type, a manufacturer, a model type, a model number, etc. can be added to the Attribute defined in the legacy NAN system. For example, the information may be added to NAN Connection Capability Attribute as shown in Table 9.

TABLE 9

| Field | Size (octets) | Value | Description |
|---|---|---|---|
| Attribute ID | 1 | 0x04 | Identifies the type of NAN attribute. |
| Length | xx | xx | Length of the following fields in the attribute. |
| Connection Capability Bitmap | 2 | Variable | A set of parameters indicating NAN Device's connection capabilities |
| Device Name | <=32 B | | User-friendly description of device |
| Manufacturer | <=64 B | | |
| Model Name | <=32 B | | |
| Model Number | <=32 B | | |
| Serial Number | <=32 B | | |
| Primary Device Type | 8 B | | |
| Secondary Device Type | <=128 B | | |
| RF Bands | 1 B | | Specific RF band used for this message |
| . . . | | | |

Embodiment 3

The embodiment 3 is directed to a method of transmitting channel information supported by a NAN device. In the NAN, a pre-fixed channel is used. That is, information on a channel capability supported by a corresponding NAN device needs to be informed in the form of a bitmap. The bitmap for the channel capability can be defined as shown in Table 10 below.

TABLE 10

| Bit(s) | Information | Notes |
|---|---|---|
| 0 | 5 GHz upper band | Channel 44 (5.220 GHz) |
| 1 | 5 GHz lower band | Channel 149 (5.745 GHz) |

Alternatively, the information on the channel capability can be transferred in the form of fields as shown in Table 11 below.

TABLE 11

| Field | Size (octets) | Value | Description |
|---|---|---|---|
| Additional channel information | 1 | 0: None<br>1: Channel 44 (5.220 GHz)<br>2: Channel 149 (5.745 GHz)<br>3: Both Channel 44(5.220 GHz) and Channel 149(5.745 GHz) | |

Moreover, since the above-mentioned information should be necessarily used when the discovery beacon frame is transmitted, the information can be added to the Attribute newly defined in NAN IE or optionally included in the synchronization beacon frame. Alternatively, the information can be included in the previously defined Attribute. For example, it may be included in a sub-field of the NAN Connection Capability Attribute as shown in Table 12 or Table 13.

TABLE 12

| Field | Size (octets) | Value | Description |
|---|---|---|---|
| Attribute ID | 1 | 0x04 | Identifies the type of NAN attribute. |
| Length | 2 | 2 | Length of the following fields in the attribute. |
| Connection Capability Bitmap | 2 | Variable | A set of parameters indicating NAN Device's connection capabilities, as defined in Table 5-11 |
| Additional Channel Information Bitmap (newly added field) | xx | xx | NAN Device's supported channels |

TABLE 13

| Field | Size (octets) | Value | Description |
|---|---|---|---|
| Attribute ID | 1 | 0x04 | Identifies the type of NAN attribute. |
| Length | 3 | 3 | Length of the following fields in the attribute. |
| Connection Capability Bitmap | 2 | Variable | A set of parameters indicating NAN Device's connection capabilities, as defined in Table 5-11 |
| Additional channel information (newly added field) | 1 | 0: None<br>1: Channel 44 (5.220 GHz)<br>2: Channel 149 (5.745 GHz)<br>3: Both Channel 44 (5.220 GHz) and Channel 149 (5.745 GHz) | |

Figure 17:
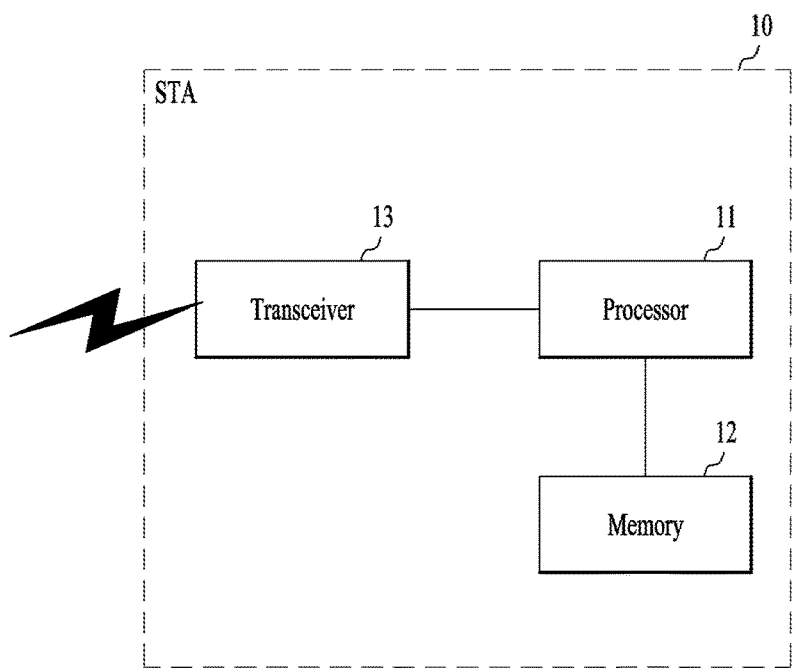
FIG. 17 is a block diagram illustrating a configuration of a wireless device according to an embodiment of the present invention.

FIG. 17 is a block diagram illustrating a configuration of a wireless device according to one embodiment of the present invention.

Referring to FIG. 17, a wireless device 10 may include a processor 11, a memory 12, and a transceiver 13. The transceiver 13 capable of transmitting/receiving radio signals can be used to implement a physical layer according to, for example, the IEEE 802 system. The processor 11 can be connected to the transceiver 13 electrically in order to implement the physical layer and/or MAC layer according to the IEEE 802 system. In addition, the processor 11 may be configured to perform operations for at least one of the application, service and ASP layers according to the aforementioned various embodiments of the present invention. Alternatively, the processor 11 may be configured to perform operations related to a device operating as an AP/STA. Moreover, a module for implementing operations of the wireless device according to the aforementioned various embodiments of the present invention may be saved in the memory 12 and then driven by the processor 11. The memory 12 may be included inside the processor 11 or be provided outside the processor 11. And, the memory 12 can be connected to the processor 11 through known means.

The detailed configuration of the wireless device 10 of FIG. 17 can be implemented such that each of the aforementioned various embodiments of the present invention is applied independently or at least two thereof are simultaneously applied. Here, redundant description shall be omitted for clarity.

The aforementioned embodiments of the present invention can be implemented using various means. For instance, the embodiments of the present invention can be implemented using hardware, firmware, software and/or any combinations thereof.

In case of the implementation by hardware, a method according to the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to the embodiments of the present invention can be implemented by modules, procedures, and/or functions for performing the above-explained functions or operations. Software code is stored in the memory unit and can be driven by the processor. The memory unit is provided within or outside the processor to exchange data with the processor through the various means known to the public.

As mentioned in the foregoing description, the detailed descriptions for the preferred embodiments of the present invention are provided to enable those skilled in the art to implement and practice the invention. While the present invention has been described herein with reference to the preferred embodiments thereof, it will be apparent to those skilled in the art that various modifications and variations can be made therein without departing from the spirit and scope of the invention. Therefore, the present invention is not limited to the embodiments disclosed herein but intends to give a broadest scope that matches the principles and new features disclosed herein.

INDUSTRIAL APPLICABILITY

Although the various embodiments of the present invention have been described focusing on the IEEE 802.11 system, the present invention can also be applied to various mobile communication systems in the same manner.

What is claimed is:

1. A method of transmitting and receiving signals by a neighbor awareness networking (NAN) device in a wireless communication system, the method comprising:
   receiving a NAN Publish from an access point (AP);
   identifying a service, from among services of one or more stations (STAs) associated with the AP, from the NAN Publish; and
   associating with the AP for the identified service,
   wherein the one or more STAs include a STA that does not support transmitting and receiving NAN related signals, and
   wherein if the identified service is a service for the STA, the identified service is provided through the AP.

2. The method of claim 1, wherein if establishment of a peer to peer (P2P) link configuration is supported between the NAN device and an STA related to the identified service, the association procedure with the AP is omitted.

3. The method of claim 1, wherein the NAN Publish corresponds to a response to a NAN Subscribe transmitted from the NAN device to the AP.

4. The method of claim 1, wherein information related to the services of the one or more STAs is cached by the AP.

5. The method of claim 4, wherein the cached information is re-configured by the AP in the form of a service descriptor containing a service name, a service status, a service updater, a MAC address of a register, and a device name of the register.

6. The method of claim 1, wherein information related to the services of the one or more STAs is registered to the AP by a generic advertisement service (GAS) initial request action frame.

7. The method of claim 1, wherein information related to the services of the one or more STAs is registered to the AP by an access network query protocol (ANQP) query request frame.

8. The method of claim 1, wherein the AP transmits information related to the services of the one or more STAs through at least one frame selected from the group consisting of a discovery beacon frame, a synchronization beacon frame, and a service discovery frame.

9. The method of claim 1, wherein the AP operates in a master-synchronization state.

10. The method of claim 1, wherein if a NAN service discovery frame transmitted from the NAN device is a response to a Subscribe message, the NAN service discovery frame contains at least one information selected from the group consisting of a device name, a manufacturer, a model name, a model number, a serial number, a primary device type, and a secondary device type.

11. A neighbor awareness networking (NAN) user equipment device in a wireless communication system, comprising:
   a receiver; and
   a processor,
   wherein the processor is configured to receive a NAN Publish from an access point (AP) using the receiver, identify a service, from among services of one or more stations (STAs) associated with the AP, from the NAN Publish, and associate with the AP for the identified service,
   wherein the one or more STAs include a STA that does not support transmitting and receiving NAN related signals, and
   wherein if the identified service is a service for the STA, the identified service is provided through the AP.

* * * * *